United States Patent
Kawamura et al.

(10) Patent No.: US 8,594,117 B2
(45) Date of Patent: Nov. 26, 2013

(54) BASE STATION AND METHOD IN MOBILE COMMUNICATIONS SYSTEM

(75) Inventors: Teruo Kawamura, Yokosuka (JP);
Yoshiaki Ofuji, Yokohama (JP);
Yoshihisa Kishiyama, Yokosuka (JP);
Kenichi Higuchi, Yokohama (JP);
Mamoru Sawahashi, Yokohama (JP);
Seizo Onoe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 863 days.

(21) Appl. No.: 12/305,173

(22) PCT Filed: Jun. 13, 2007

(86) PCT No.: PCT/JP2007/061941
§ 371 (c)(1),
(2), (4) Date: Apr. 2, 2009

(87) PCT Pub. No.: WO2007/148590
PCT Pub. Date: Dec. 27, 2007

(65) Prior Publication Data
US 2009/0207803 A1  Aug. 20, 2009

(30) Foreign Application Priority Data

Jun. 19, 2006  (JP) .............................. 2006-169451

(51) Int. Cl.
*H04W 4/00* (2009.01)
*H04L 12/28* (2006.01)
*H04J 4/00* (2006.01)

(52) U.S. Cl.
USPC ............ 370/436; 370/330; 370/431; 370/478

(58) Field of Classification Search
USPC ......... 370/203, 204, 210, 278, 281, 328–330, 370/431, 436, 476–478
See application file for complete search history.

(56) References Cited

U.S. PATENT DOCUMENTS 7,133,688 B2 * 11/2006 Das et al. ................. 455/522
2006/0211426 A1 * 9/2006 Costa et al. .............. 455/450

(Continued)

FOREIGN PATENT DOCUMENTS

| TW | I234946 B | 6/2005 |
| TW | I234954 B | 6/2005 |

(Continued)

OTHER PUBLICATIONS

Costa et al, English Translation of WO 2005/020613, published Mar. 2, 2005.*

(Continued)

*Primary Examiner* — Redentor Pasia
(74) *Attorney, Agent, or Firm* — Osha Liang LLP

(57) ABSTRACT

A base station in a mobile communications system which uses a single-carrier technique for uplink includes a classifying unit which classifies, for each of multiple user apparatuses according to a path loss between the respective user apparatus and the base station, the multiple user apparatuses into two or more groups; and a scheduler which plans allocating of uplink resources to the user apparatuses. Uplink signals of each user apparatus that have multiple frequency components lined up in equal frequency intervals are multiplexed using a distributed frequency division multiplexing technique such that they are made mutually orthogonal on a frequency axis, the scheduler plans the resource allocating such that the user apparatuses belonging to different groups utilize different group bands or different time slots, and the group bands are specified by dividing a system band into groups.

9 Claims, 11 Drawing Sheets

(56) References Cited

U.S. PATENT DOCUMENTS

| | | | |
|---|---|---|---|
| 2006/0280113 A1* | 12/2006 | Huo | 370/208 |
| 2006/0285600 A1* | 12/2006 | Duncan | 375/260 |
| 2007/0004465 A1* | 1/2007 | Papasakellariou et al. | 455/571 |
| 2007/0178930 A1* | 8/2007 | Xiao et al. | 455/522 |

FOREIGN PATENT DOCUMENTS

| | | |
|---|---|---|
| TW | I234966 B | 6/2005 |
| TW | I235568 B | 7/2005 |
| TW | I235614 B | 7/2005 |
| WO | 0237890 A2 | 5/2002 |
| WO | 0247361 A2 | 6/2002 |
| WO | 2002/073831 | 9/2002 |
| WO | 03047032 A1 | 6/2003 |
| WO | 2004034219 A2 | 4/2004 |

OTHER PUBLICATIONS

NTT DoCoMo, Multiplexing Method for Orthogonal Reference Signals for E-UTRA Uplink, R1-061193, May 8, 2006.*
International Search Report (English & Japanese) for PCT/JP2007/061941 mailed Sep. 11, 2007 (8 pages).
Written Opinion of ISA (Japanese) for PCT/JP2007/061941 mailed Sep. 11, 2007 (3 pages).
3GPP TSG RAN WG1 Meeting #45, R1-061203 "Frequency Domain Channel-Dependent Scheduling with Adaptive Transmission bandwidth of Pilot Channel for CQI Measurement for E-Utra Uplink" NTT DoCoMo, Inc. et al. May 8-12, 2006 (10 pages).
3GPP TSG RAN WG1 LTE Ad Hoc, R1-061676 "Multiplexing Method for Orthogonal Reference Signals for E-Utra Uplink" NTT DoCoMo, Inc. et al. Jun. 27-30, 2006 (13 pages).
Japanese Office Action for Application No. 2006-169451, mailed on Mar. 1, 2011 (4 pages).
NTT DoCoMo, Multiplexing Method for Orthogonal Reference Signals for E-UTRA Uplink, 3GPP TSG-RAN WG1 Meeting #45 R1-061193, 3GPP, Mar. 8, 2006, R1-061193, pp. 1-13.
esp@cenet Patent Abstract for Taiwanese Publication No. 1235568, publication date Jul. 1, 2005. (1 page).
Taiwanese Office Action for Application No. 096121821, mailed on Jul. 7, 2010 (6 pages).
Extended European search report for European Application No. 07745208.4 dated Mar. 19, 2013 (10 pages).
3GPP TSG RAN WG1 Meeting #46bis, R1-062729 (Original R1-062104); "Group-wised Frequency Resource Allocation for Frequency Domain Channel-dependent Scheduling in SC-Based E-UTRA Uplink"; NTT DoCoMo, Fujitsu, Mitsubishi Electric, NEC, Panasonic, Sharp, Toshiba Corporation; Seoul, Korea, Oct. 9-13, 2006 (12 pages).

* cited by examiner

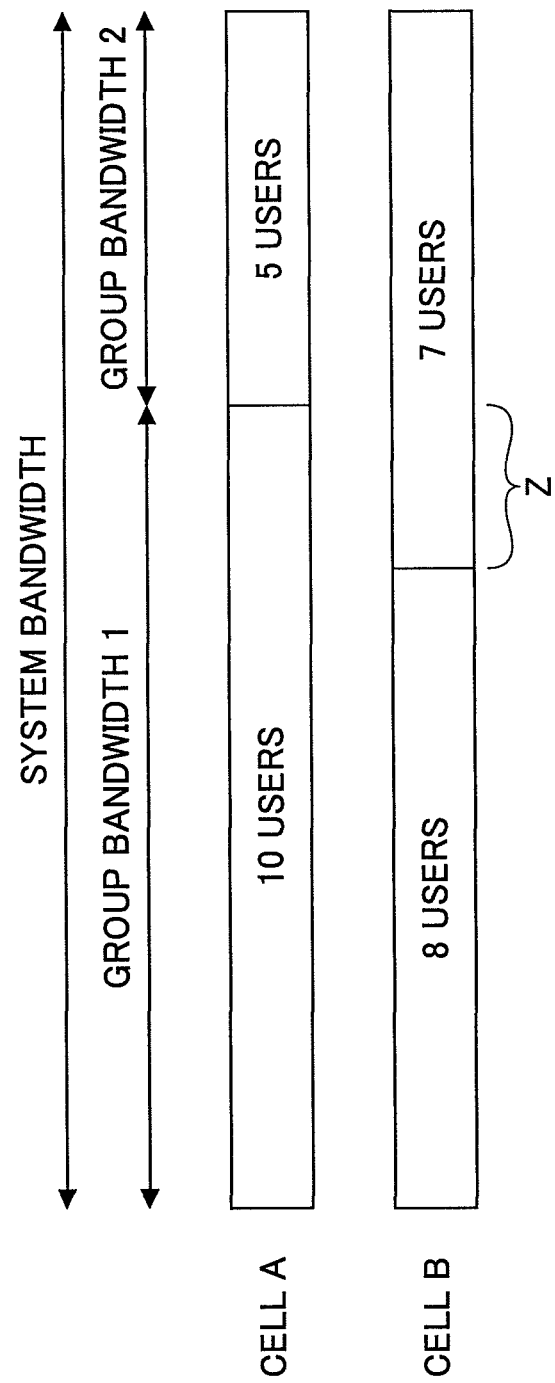

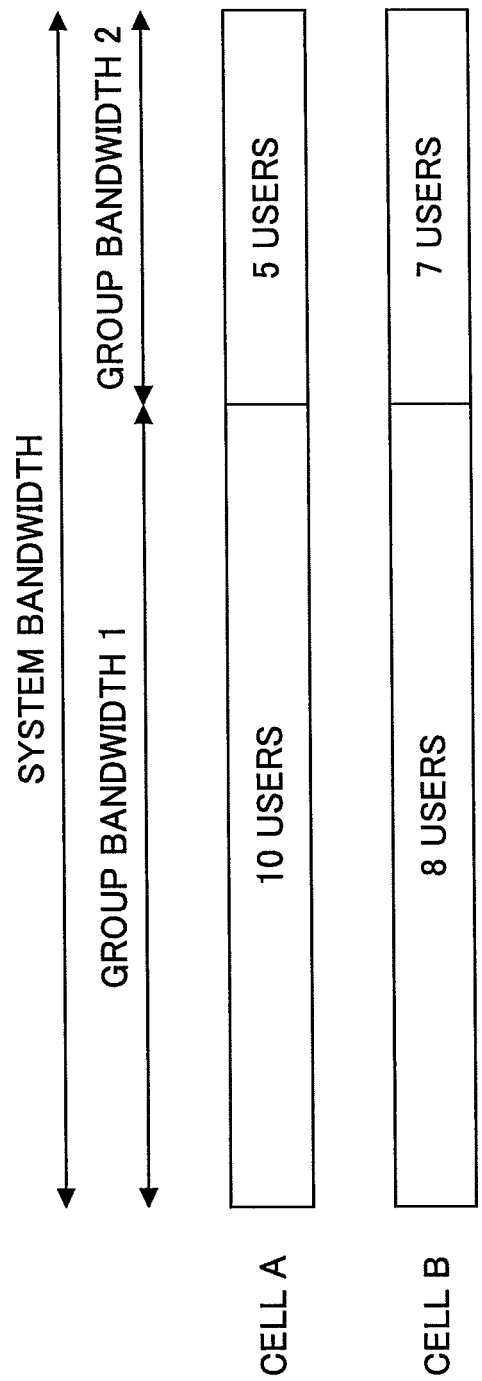

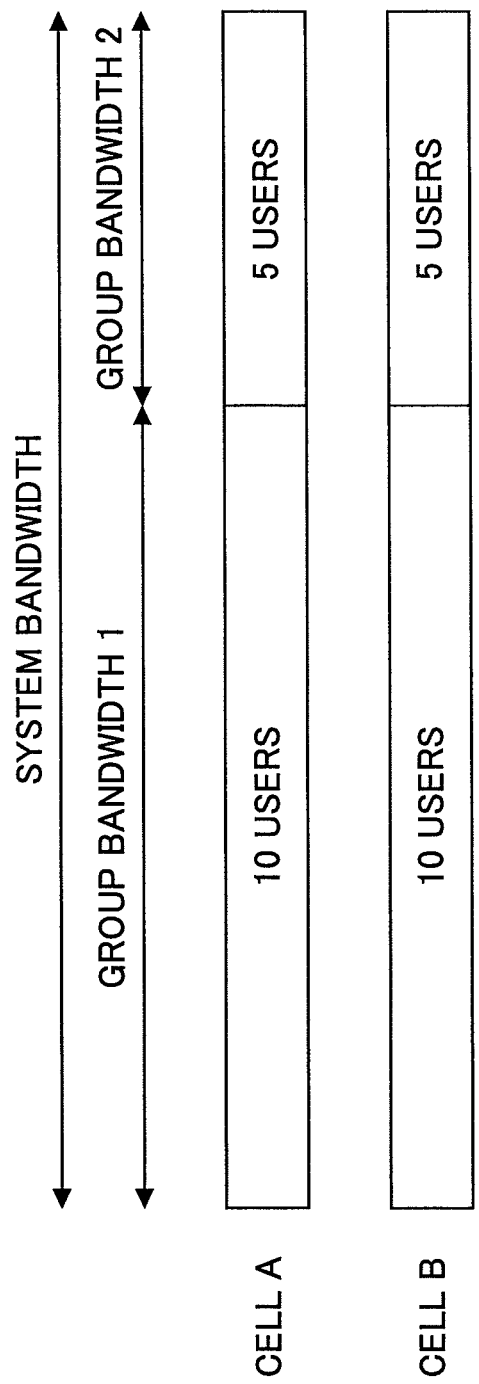

BASE STATION AND METHOD IN MOBILE COMMUNICATIONS SYSTEM

BACKGROUND OF THE INVENTION

1. Field of the Invention

The present invention relates generally to the technical field of mobile communications, and specifically to base stations and methods in mobile communications system.

2. Description of the Related Art

In this type of technical field, research and development related to next-generation communications systems are being carried out rapidly. In communications systems envisaged at the moment, a single-carrier technique is being used for uplink from a viewpoint of increasing the coverage while reducing the peak-to-average power ratio (PAPR).

For both uplink and downlink, radio resources are appropriately allocated, according to the channel state, etc., of each user, in the form of shared channels to be shared among multiple users. The process of determining what are allocated is called scheduling. In order to perform scheduling appropriately, each user apparatus transmits a pilot channel to a base station, which evaluates the uplink channel state according to the receive quality thereof. In this case, transmitting the pilot channel in bandwidths varying from narrow to wide is disclosed in Non-patent document 1, for example.

Non-patent document 1

3GPP, R1-061203, "Frequency Domain Channel-Dependent Scheduling with Adaptive Transmission Bandwidth of Pilot Channel for CQI Measurement for E-UTRA Uplink"

SUMMARY OF THE INVENTION

Problem(s) to be Solved by the Invention

FIG. 1 shows how the transmit bandwidth of the pilot channel is changed according to how good the path loss is. The path loss or propagation loss L is obtained by receiving an uplink pilot channel and transmit power information thereof over a period of time, and measuring the average value of the receive power. The path loss L is determined primarily by distance change or shadowing. Receive quality values are averaged over a relatively long time period such as a time period covering one or more frames to eliminate the effect of instantaneous change such as fading. Moreover, averaging over an appropriate length of time generally leads to no large difference in path loss between uplink and downlink.

The smaller the path loss the better the channel state, so that the required quality should be maintained even for low transmit power per band. Therefore, the pilot channel is transmitted over a wide band (see FIG. 1, top row). On the contrary, the larger the path loss the poorer the channel state, so that it would be difficult to maintain the required quality for a low transmit power per band. Therefore, a pilot channel is transmitted over a relatively narrow band with relatively high power (see FIG. 1, middle row). In FIG. 1, while the bandwidth is explicitly shown, for brevity and clarity of illustration, the relationship in magnitude of transmit powers of the user apparatuses is not explicitly shown. The base station may measure the channel state over a wide frequency band for a user with a good channel state. On the other hand, for a user with a poor channel state, the frequency range would be restricted, but the channel state for the narrow frequency range may be measured accurately. As a result, a situation in which a user with a poor channel state has little opportunity for resources to be allocated may be improved. If the pilot channel is transmitted from a user apparatus at lower power over a wide band in a poor channel state, the base station cannot appropriately evaluate the channel state, so that there is a concern that the opportunity for such a user to be allocated resources may diminish in an extreme manner. FIG. 1 bottom row shows how, when a user apparatus transmits an uplink data channel, a pilot channel is transmitted over a bandwidth corresponding to the uplink data channel. The pilot channel being transmitted in top and middle rows of FIG. 1 is a pilot channel for measuring the channel state (propagation path state) before resource allocation. The pilot channel in bottom row of FIG. 1, which is also referred to as a signal for channel compensation, is used to measure how distorted a data channel transmitted in a resource actually allocated is when received at the base station and compensate for such distortion.

The three types of pilot channels shown in FIG. 1 need to be made mutually orthogonal. In this case, as the bandwidths vary, it is not easy to use code division multiplexing (CDM). The CDM is effective as a technique of multiplexing in the same bandwidth. Thus, it is desirable to multiplex using a FDM technique for multiplexing signals of different bandwidths. The FDM techniques include at least two types, a localized FDM technique and a distributed FDM technique. The former divides the band along the frequency axis among the number of users. In the latter technique, the phase of the signal of each user is adjusted such that many frequency components, each of which is mutually lined up in a comb-tooth shape in equal intervals, are included and different users have different frequency components. Such signal processing as described above may be performed using a technique such as Variable Spreading Chip Repetition Factor-CDMA (VSCRF-CDMA), or any other technique in which inverse Fourier transformation follows a process in the frequency domain following Fourier transformation. At any rate, even in a single-carrier technique, a signal may be handled as one having many frequency spectra. From a viewpoint that each user utilizes as wide a band as possible, multiplexing of multiple users is preferably done using the technique known as distributed frequency division multiplexing (distributed FDM). Even for the example shown in FIG. 1, the distributed FDM technique is being used. While all frequency components are drawn in top, middle, and bottom rows as if they are being used continuously for convenience of illustration, as shown in an enlarged view guided with broken lines, they are actually lined up such that the user frequency components, which are lined up in a comb-tooth shape, are made mutually orthogonal. While the relationship in magnitude of transmit powers of the user apparatuses is not explicitly shown for brevity and clarity of illustration, when the user apparatuses actually transmit, a wideband signal has low power per unit bandwidth, while a narrowband signal has high power per unit bandwidth.

In this way, when multiplexing is performed using the distributed FDM technique, the number of user signals which can be multiplexed orthogonally depends on the frequency intervals lined up in a comb-tooth shape. The larger the comb-tooth shaped frequency interval, the larger the number of user signals which can be multiplexed. In the illustrated example, the frequency interval amounts to three sub carriers, so that three user signals are multiplexed. If the frequency interval amounts to six sub carriers, six user signals may be multiplexed Now, as described above, the FDM as well as the CDM may be utilized for users of the same bandwidth. Therefore, the number of user signals which may be multiplexed using the FDM as well as the number of user signals which may be multiplexed using the CDM may be carried in uplink. On the other hand, the number of spread code sequences which may be provided using the CDM technique depends on the comb-tooth shaped frequency interval of the distributed FDM. The smaller the frequency interval, the larger the number of spread code sequences which may be provided, while the larger the frequency interval, the smaller the number of spread code sequences which may be provided. Thus, it would become difficult to increase the number of users which may be multiplexed using both the distributed FDM and the CDM. In many cases, orthogonal multiplexing in the same bandwidth is directly linked to suppressing interference within the same cell, while orthogonal multiplexing related to different bandwidths is directly linked to suppressing other-cell interference. Therefore, a difficulty in performing orthogonal multiplexing using the distributed FDM or the CDM in a sufficient manner could cause own-cell interference or other-cell interference.

The present invention, which is designed to overcome at least one of the problems as described above, seeks to secure as many user signals as possible which may be made orthogonal using the distributed FDM technique, or using both the distributed FDM technique and the CDM technique in uplink communications.

Means for Solving the Problem

According to the present invention, a base station is used in a mobile communications system which uses a single-carrier technique for uplink. The base station includes a classifying unit which classifies, for each of multiple user apparatuses according to a path loss between the respective user apparatus and the base station, the multiple user apparatuses into two or more groups; and a scheduler which plans allocating of uplink resources to the user apparatuses, wherein uplink signals of each user apparatus that have multiple frequency components lined up in equal frequency intervals are multiplexed using a distributed frequency division multiplexing technique such that they are made mutually orthogonal on a frequency axis, wherein the scheduler plans the resource allocating such that the user apparatuses belonging to different groups utilize different group bands or different time slots, and wherein the group bands are specified by dividing a system band into groups.

Advantage of the Invention

The present invention makes it possible to secure as many user signals as possible which may be made orthogonal using the distributed FDM technique, or using both the distributed FDM technique and the CDM technique in uplink communications.

BRIEF DESCRIPTION OF THE DRAWINGS

FIG. 9A is a diagram showing an example of a group band allocation which varies from one cell to another (ratio in group bandwidths=ratio in the numbers of users);

FIG. 9B is a diagram showing an example of a group band allocation which is common to each cell (ratio in group bandwidths≠ratio in the numbers of users); and FIG. 9C is a diagram showing an example of a group band allocation which is common to each cell (ratio in group bandwidths=ratio in the numbers of users).

DESCRIPTION OF THE PREFERRED EMBODIMENTS

Description of Notations

21 Transmit bandwidth determining unit; 22 Transmit band determining unit; 23 Transmit band manager; 24 Code allocator; 25 Code manager; 31 Transmit signal sequence generator; 32 Discrete Fourier transformer (DFT); 33 Data mapper; 34 Inverse Fourier transformer; 35 Transmit frame timing adjuster

BEST MODE OF CARRYING OUT THE INVENTION

While a number of embodiments are described below, breakdown of the respective embodiments are not essential to the present invention, so that two or more embodiments may be used as needed. Unless specifically noted, numerical examples in the explanations herein are merely exemplary, so that any appropriate numerical value may be used.

Embodiment 1

Figure 2:
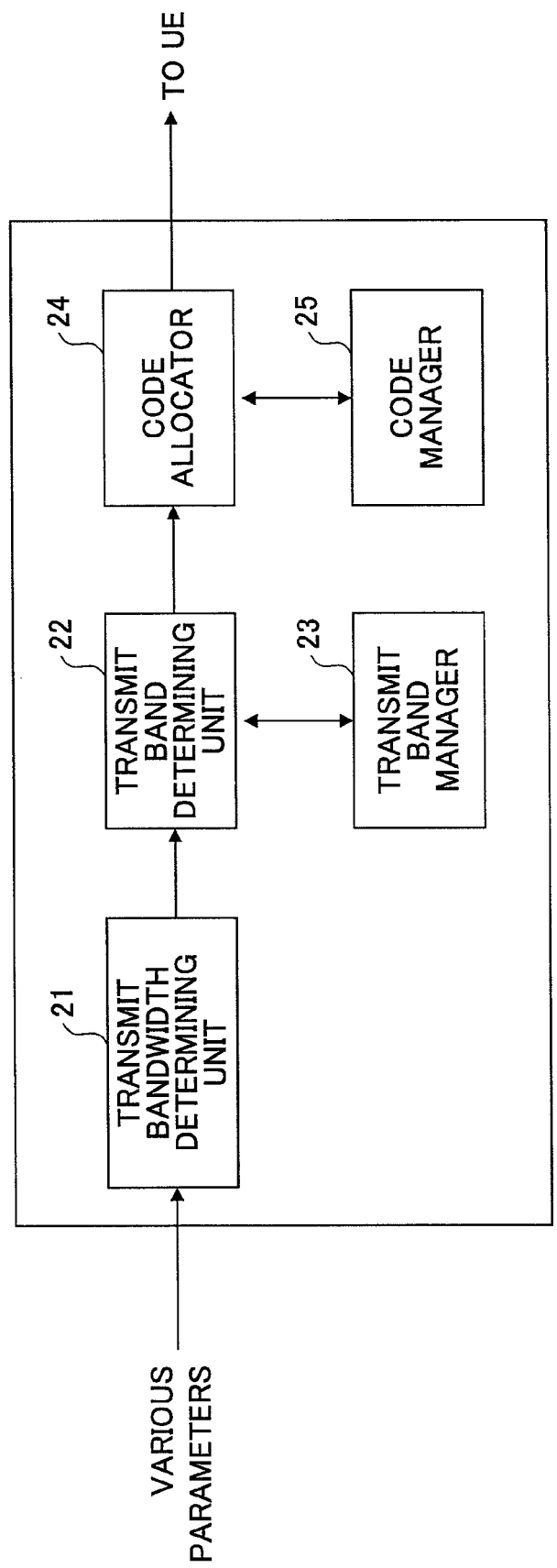
FIG. 2 is a partial functional block diagram of a base station according to an embodiment of the present invention.

FIG. 2 shows a part of a base station according to an embodiment of the present invention. FIG. 2 shows a transmit bandwidth determining unit 21, a transmit band determining unit 22, a transmit band manager 23, a code allocator 24, and a code manager 25.

The transmit bandwidth determining unit 21 receives various parameters, and determines, based thereon, a transmit bandwidth of a pilot channel to be transmitted by a user apparatus. The pilot channel as described above is a signal for measuring the state of a propagation path over which a user apparatus transmits prior to resource allocation, and differs from a pilot channel transmitted for compensating a channel transmitted in a resource actually allocated. In order to distinguish the two types of pilot channels, the former is to be called a signal for measuring the channel state, or a signal for measuring the propagation path state, while the latter is to be called a signal for channel compensation.

Various parameters received by the transmit bandwidth determining unit 21 may include other-cell interference power observed at the base station, the maximum transmit power of the user apparatus, and propagation loss (path loss), reported from each user apparatus. The transmit bandwidth determining unit 21 classifies user apparatuses into groups based on at least the path loss of the parameters as described above. For example, the user apparatuses are classified into two groups based on the magnitude of the path loss. The transmit bandwidth determining unit 21 determines, for each group, the bandwidth for a user apparatus to transmit a signal for measuring the channel state. The user apparatus in a group with a smaller path loss transmits a signal for measuring the channel state over a relatively wide band, while the user apparatus in a group with a larger path loss transmits a signal for measuring the channel state over a relatively narrow band. Typically, the number of groups is two, so that two types of transmit bands, wide and narrow, are provided. However, more than two groups and transmit bandwidths may be provided. As described in the embodiments below, from a viewpoint of classifying into groups according to the accurate channel state, it is desirable to take into account not only the path loss, but also the maximum transmit power of the user apparatus, and the other-cell interference.

The transmit band determining unit 22 maps, for each group, the respective user apparatus signals on the frequency axis based on a command from the transmit band manager 23. The signals transmitted by multiple user apparatuses that have different bandwidths are mutually multiplexed using the distributed FDM technique. The signals transmitted by user apparatuses that have the same bandwidths are multiplexed using the distributed FDM technique and, as needed, by the CDM technique.

The transmit band manager 23 manages the mapping position in the transmit band determining unit 22. More specifically, it manages the sub carrier interval (or repetition factor) which is used in the distributed FDM technique, or the mapping position of frequency components of two or more user apparatuses, so that the components are made mutually orthogonal.

The code allocator 24 multiplies, as needed, a signal input thereto by a spread code to perform code spreading.

The code manager 25 manages the spread code used at the code allocator 24.

The parameters used are reported to the user apparatuses. The parameters reported may include transmit bandwidth, frequency, repetition factor, and spread code. CAZAC codes, when used, themselves make up the signal for measuring the channel state and/or the signal for channel compensation, so that they are not multiplied by any other signal. In this case, a code-distinguishing parameter such as the amount of cyclical shift of the CAZAC code sequence is reported to the user apparatus. As described below, when signals for measuring the state of different channels of wideband and narrowband are time-division multiplexing (TDM) transmitted, the parameter reported to the user apparatus also includes information related to transmit frame timing or time slot.

Figure 3:
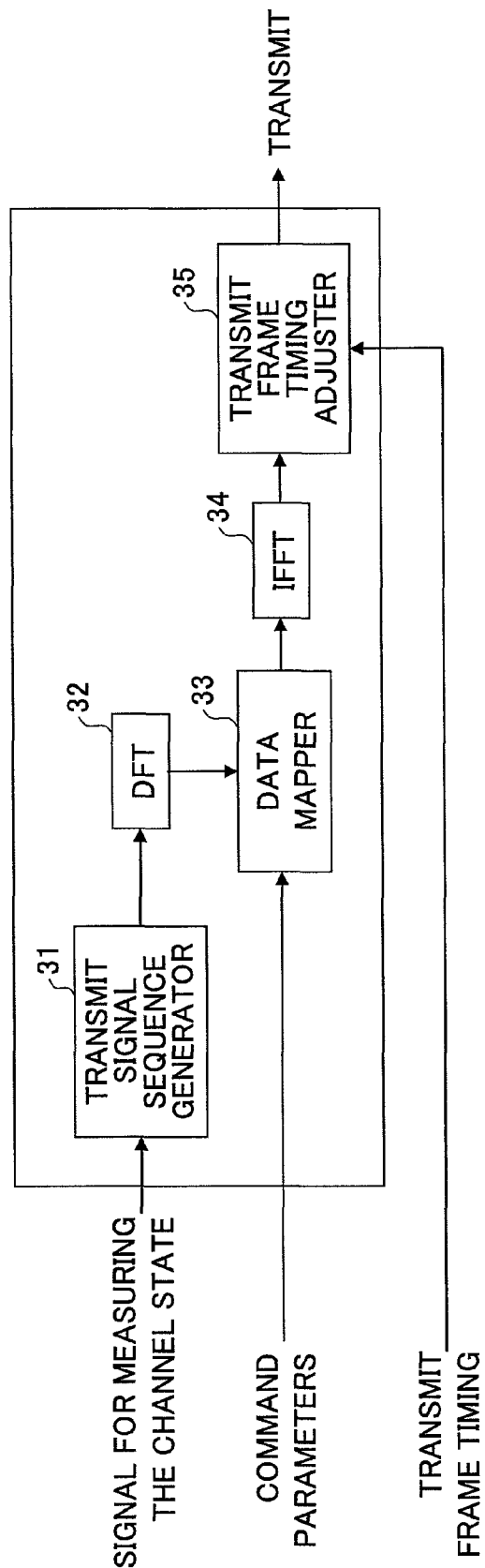
FIG. 3 is a partial functional block diagram of a user apparatus according to an embodiment of the present invention.

FIG. 3 shows a part of a user apparatus according to an embodiment of the present invention. FIG. 3 shows a transmit signal sequence generator 31, a discrete Fourier transformer (DFT) 32, a data mapper 33, an inverse Fourier transformer 34, and a transmit frame timing adjuster 35.

The transmit signal sequence generator 31 generates a transmit signal sequence. The transmit signal sequence may include any channel to be uplink transmitted. In particular, in the present embodiment, the transmit signal sequence generator 31 generates signal sequences of signals for measuring the channel state and for channel compensation. When expressing the signals for measuring the channel state and for channel compensation in the CAZAC codes, the amount of cyclic shift and sequence information for specifying the code sequence is input to the transmit signal sequence generator 31.

The discrete Fourier transformer (DFT) 32 Fourier transforms a transmit signal from a time-domain signal to a frequency-domain signal.

The data mapper 33 performs mapping, according to command parameters, such that the transmit signal has desired components in the frequency domain. The command parameters include the transmit bandwidth, transmit band (frequency), repetition factor, etc. The data mapper 33 maps the transmit signal components onto the frequency axis such that transmit signals of user apparatuses that have different bandwidths are made mutually orthogonal using the distributed FDM technique.

The inverse Fourier transformer 34 fast inverse Fourier transforms a signal having desired frequency components into a time-domain signal.

The transmit frame timing adjuster 35 adjusts transmit timing of a transmit signal, and outputs the transmit signal. In particular, when time division multiplexing (TDM) is performed, a signal is transmitted by the adjuster 35 according to a transmit slot of an own station.

Figure 4:
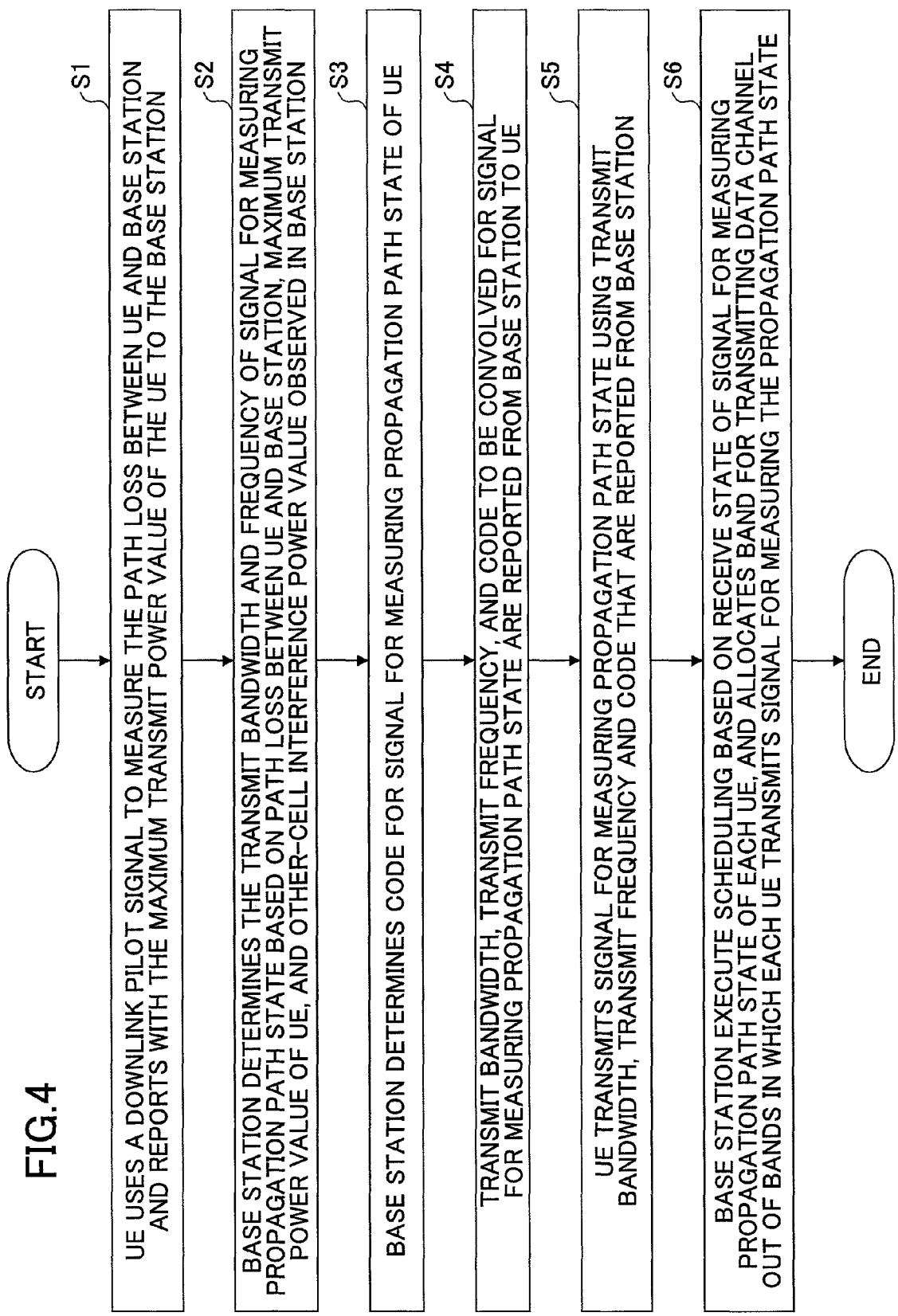
FIG. 4 is a flowchart for explaining operations according to an embodiment of the present invention.

FIG. 4 is a flowchart for explaining operations according to an embodiment of the present invention.

In step S1, a user apparatus (UE) receives a downlink pilot signal, and uses the received signal to measure the path loss L between the user apparatus and base station. The path loss is reported along with the maximum transmit power value Pmax of the user apparatus to the base station.

In step S2, the base station receives the path loss L and maximum transmit power Pmax from the user apparatus. The base station also measures other-cell interference power I. The base station measures the channel state based on any one of: the path loss L only; the path loss L and the maximum transmit power (Pmax-L); the path loss and the other-cell interference power value (L+1); the path loss and the maximum transmit power and the other-cell interference power value (Pmax-L-1), etc., and classifies the multiple user apparatuses into two or more groups according to how good the channel state is. From a viewpoint of providing for the group classification to reflect as accurately as possible how good the channel state is, it is desirable to take into account the maximum transmit power and the interference power as well as the path loss. In the present embodiment, the user apparatuses are classified into two groups according to how good the channel state is.

The base station determines the transmit bandwidth and the transmit frequency of a signal for measuring the state of a propagation path used by each group based on the path loss between the user apparatus (UE) and the base station, and the maximum transmit power value of the UE that are reported from the user apparatus, and the other-cell interference power value. A wide transmit bandwidth is allocated to a group with a good channel state, while a narrow transmit bandwidth is allocated to a group with a poor channel state.

In step S3, a code for a signal for measuring the channel state that is used by an individual apparatus is determined at the base station. As described above, among the signals of user apparatuses that have different bandwidths, the distributed FDM multiplexing, not code multiplexing, is performed. However, among the signals of user apparatuses that have the same bandwidth, the CDM multiplexing may be used together with the FDM.

In step S4, the transmit bandwidth, the transmit frequency, and the code to be convolved for the signal for measuring the channel state are reported from the base station to the user apparatus.

In step S5, the user apparatus uses the transmit bandwidth, transmit frequency, and code that are reported from the base station to transmit the signal for measuring the channel state. In the present embodiment, a wide transmit bandwidth is allocated to a group with a good channel state, so that the user apparatus of the group as described above transmits a signal over a wide band at relatively low power (power per unit band). The user apparatus of a group with a poor channel state transmits a signal over a narrow band at relatively high power.

In step S6, the base station receives, from each user apparatus, a signal for measuring the channel state. The base station executes uplink scheduling based on the receive state. In this case, the user apparatus in a group with a good channel state transmits a signal over a wide band at relatively low power, so that the channel state is measured over the wide band, and a resource block is allocated to a user apparatus with a better channel state. On the other hand, the user apparatus of a group with a poor channel state transmits a signal over a narrow band at relatively high power. Therefore, in the latter case, while the channel state may not be measured over the wide band, it may be accurately measured with respect to a narrow band over which a signal is transmitted at relatively high power. As the channel state is accurately measured, it is possible to expect a further increase in opportunities for allocating a resource block to a user apparatus of such a group as described above. In this way, the base station executes the scheduling and allocates at least one resource block to each user apparatus.

Figure 5:
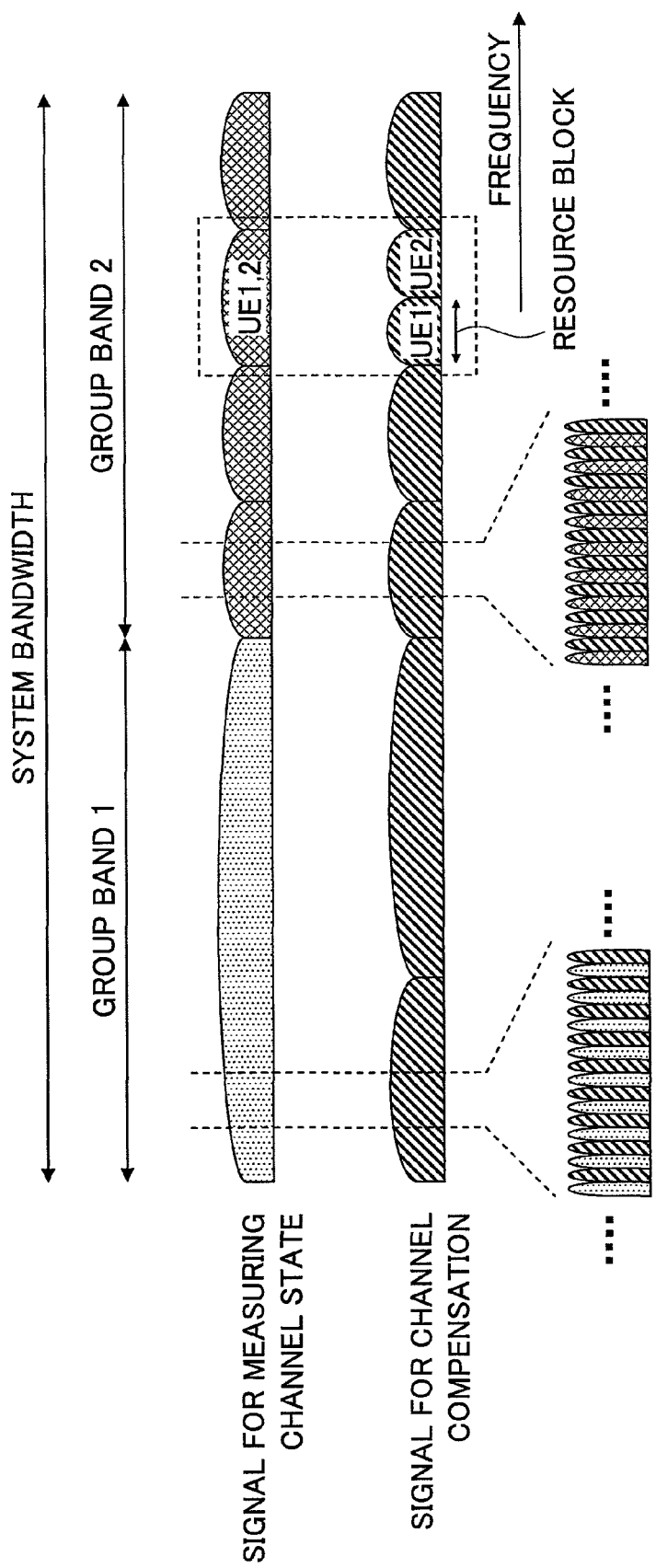
FIG. 5 is a schematic diagram of frequency spectra implemented according to an embodiment of the present invention.

FIG. 5 is a schematic diagram of frequency spectra implemented according to an embodiment of the present invention. For example, a system band such as 10 MHz is divided for each group of user apparatuses. The divided system bands are referred to as "group bands". The "system band" represents an overall frequency band available for use by the system. The system band includes a predetermined number of resource blocks (RB) having a predetermined bandwidth and a predetermined time period. As an example, in the system band, there are 24 resource blocks, each of which amounts to 375 kHz and 0.5 ms. The user apparatus conducts communications using the scheduled one or more resource blocks according to the bandwidth available for use (e.g., 1.25 MHz, 2.5 MHz, and 5 MHz). The group bands are frequency-divided one for each group classified according to how good the path loss is. In the illustrated example, two group bands, 1 and 2, are provided, corresponding to the two groups, with the left-hand side corresponding to a user apparatus with a good channel state and the right-hand side corresponding to a user apparatus with a poor channel state. While both of the bandwidths are set as 5 MHz for brevity and clarity, a ratio in bandwidths may be set at various values as described below.

Figure 1:
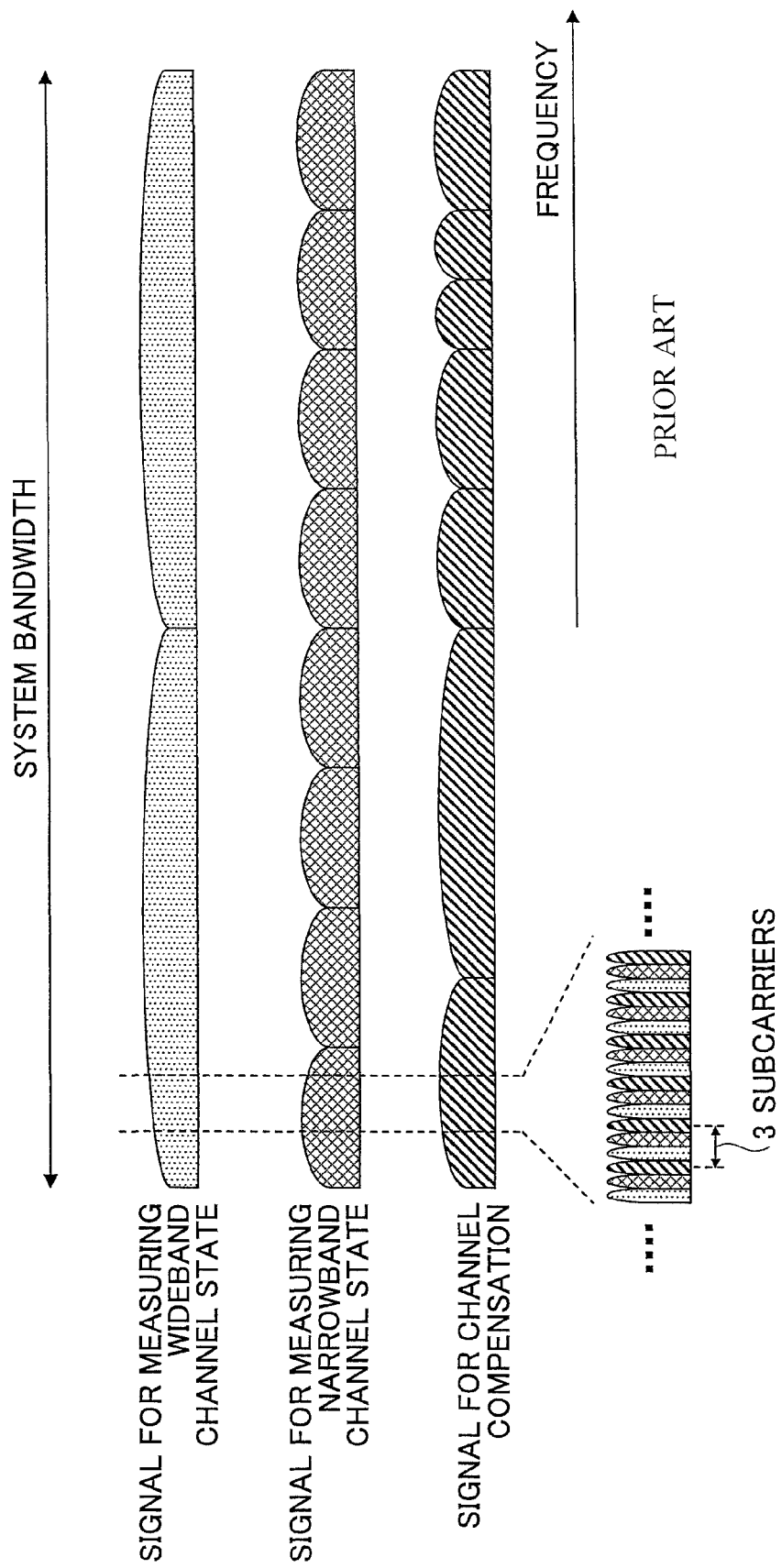
FIG. 1 is a diagram showing how the transmission bandwidth of the pilot channel is changed according to how good the path loss is.

While a signal for measuring the channel state is shown on the upper row and a signal for compensation is shown on the lower row for convenience of explanations, these signals are actually multiplexed using the distributed FDM technique, as shown in an enlarged view. In a manner which is different from a related-art technique shown in FIG. 1, in the example shown in FIG. 5, a signal for a user apparatus in group 1 (wideband) and a signal for a user apparatus in group 2 (narrowband) belong to mutually different group bands. In the example shown in FIG. 1, the signal for measuring the wideband channel state and the signal for measuring the narrowband channel state, and the signal for compensating the wideband and narrowband channel states are multiplexed using the distributed FDM technique. In the example shown in FIG. 5, what are multiplexed using the distributed FDM technique are the signal for measuring the channel state and the signal for compensating the channel state within each group band. Thus, the number of types of signals which must be made orthogonal using the distributed FDM is less than that for the case of FIG. 1, so that, as a result, more sub carrier intervals may be secured. This means that more code sequences for code multiplexing within the same bandwidth may be held than in the case of FIG. 1.

Embodiment 2

Figure 6:
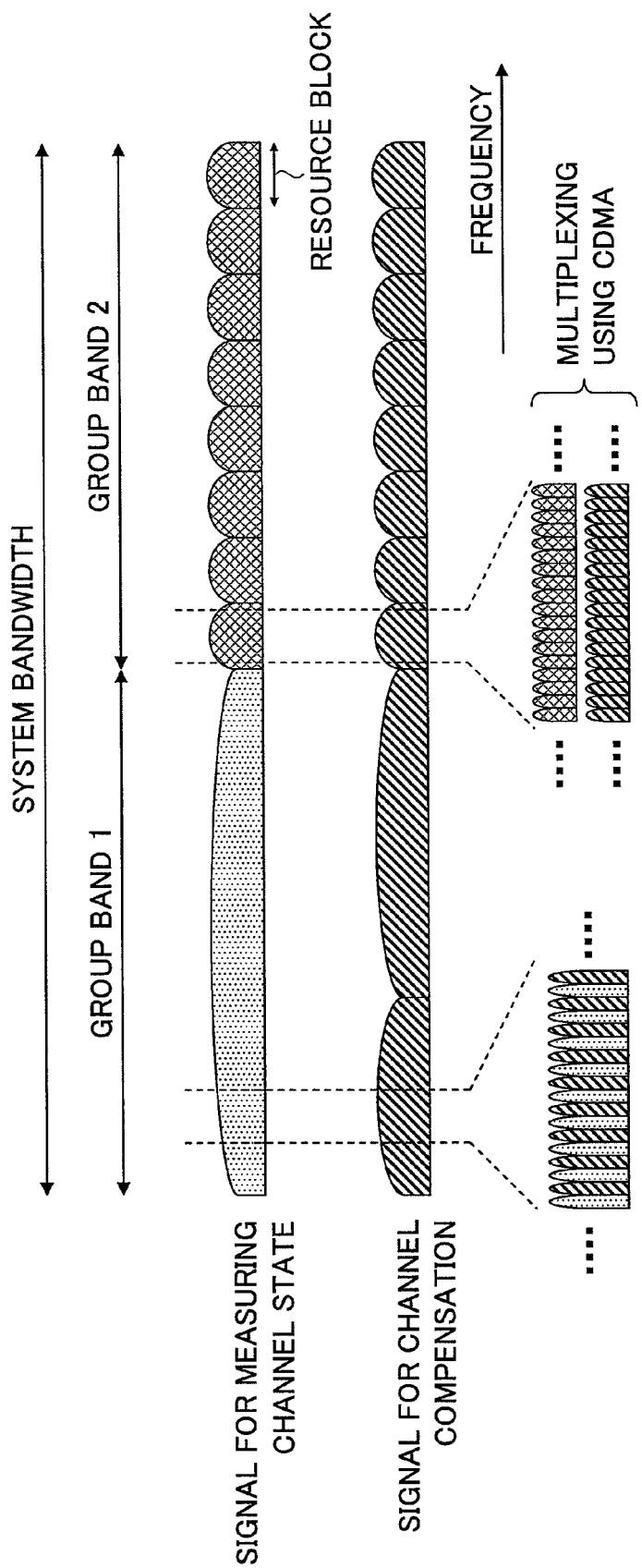
FIG. 6 is a schematic diagram of frequency spectra implemented according to an embodiment of the present invention.

FIG. 6 is a schematic diagram of frequency spectra implemented according to an embodiment of the present invention. What is in FIG. 6 is generally the same as in the example shown in FIG. 5, but the transmit bandwidths used by the user apparatuses which belong to the group band 2 differ from those in the example shown in FIG. 5. In the present example, the transmit bandwidths are made common and each corresponds to one resource block. As a result, with respect to the group band 2, the signal for measuring the channel state and the signal for channel compensation are always transmitted over the same bandwidth. In the example shown in FIG. 5, as shown in the broken-line frame on the right-hand side, the signal for measuring the channel state is set at an integer multiple (twice in the illustrated example) of the resource block, so that one or more resource blocks are allocated to either one or both of the user apparatus 1 and 2 (UE 1 and 2). As the bandwidth occupying the signal for measuring the channel state is larger than the resource block, it is not possible to use the CDM scheme for multiplexing the signal for measuring the channel state and the signal for channel state compensation. On the other hand, with respect to the group band 2 in the example shown in FIG. 6, the signal for measuring the channel state and the signal for channel compensation are transmitted over the same bandwidth (corresponding to one resource block), so that the distributed FDM as well as the CDM may be used for their multiplexing, making it possible to increase the number of user apparatus signals which may be multiplexed.

Embodiment 3

Figure 7:
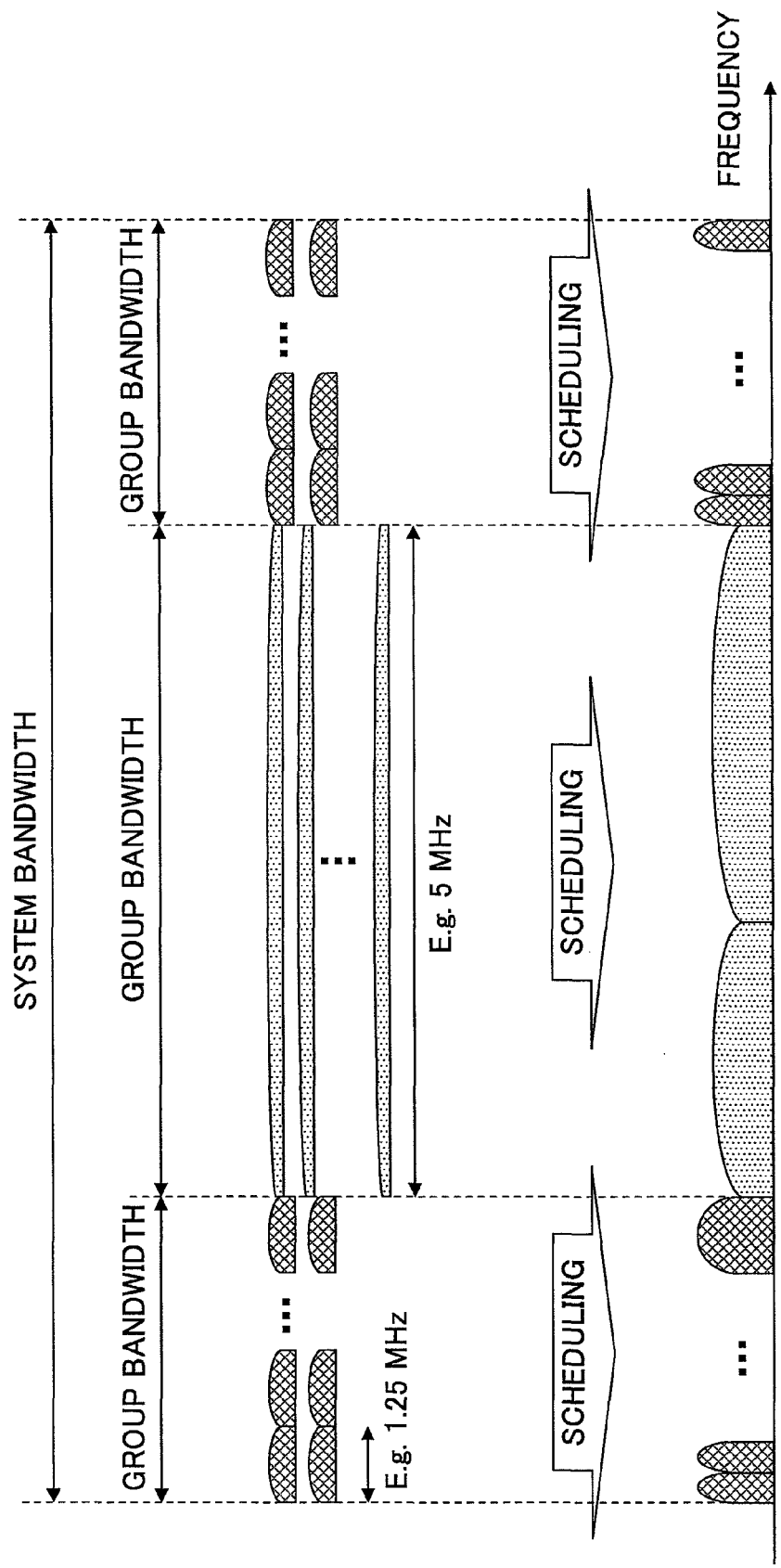
FIG. 7 is a schematic diagram of frequency spectra implemented according to an embodiment of the present invention.

FIG. 7 is a schematic diagram of frequency spectra implemented according to an embodiment of the present invention. As in the embodiments previously described, the user apparatuses are classified into groups according to the path loss, etc., and the system band is divided into a wideband group band and a narrowband group band. In the present embodiment, narrowband group bands are allocated on both sides of the wideband group band. In general, out-of-band emission due to a signal transmitted over a wide bandwidth is relatively large, while out-of-band emission due to a signal transmitted over a narrow band is relatively small. Therefore, from a viewpoint of suppressing as much as possible the effect of interference power on bands outside the system band (the neighboring bands), it is desirable that both sides of the system bandwidth be used for transmitting a relatively narrow band signal, as shown in FIG. 7.

Embodiment 4

Figure 8:
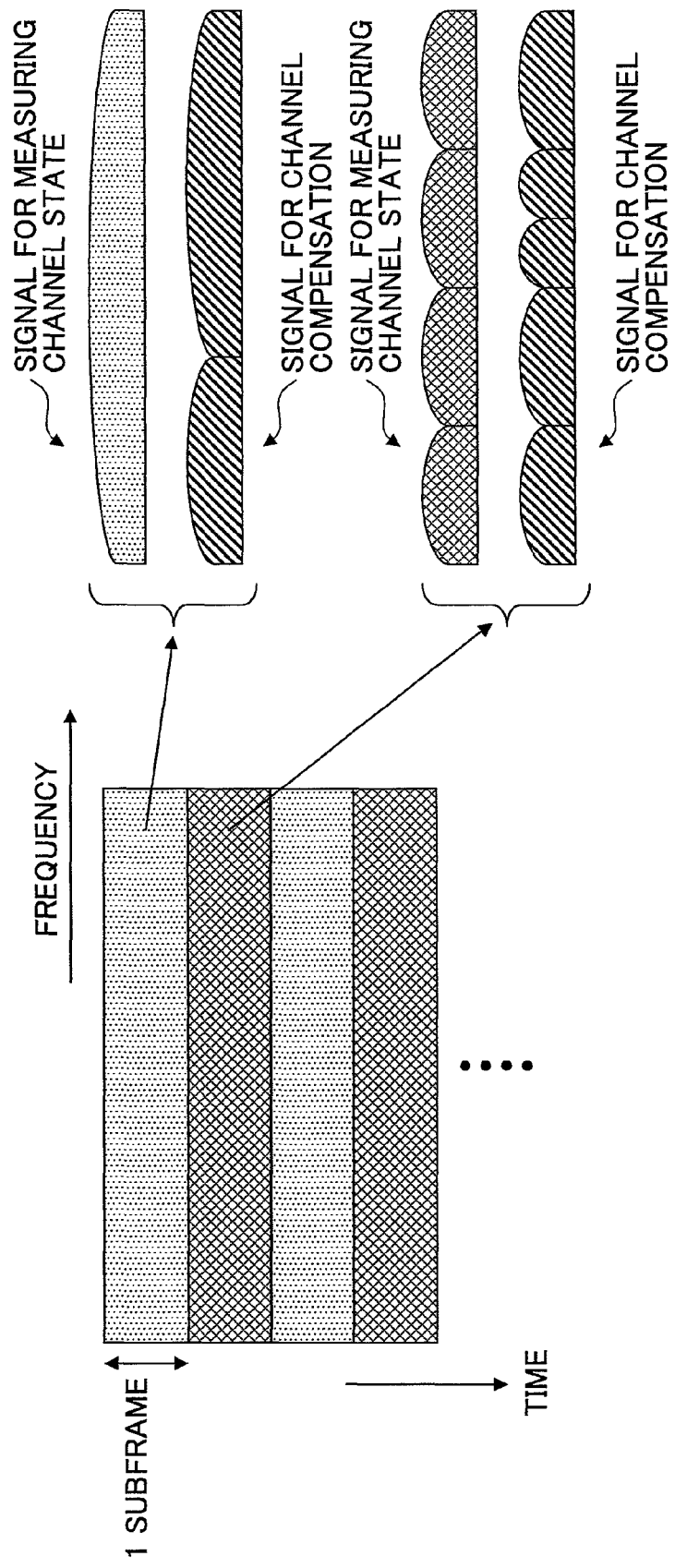
FIG. 8 is a diagram illustrating how TDM is performed.

FIG. 8 shows how time division multiplexing (TDM) is performed. In the first through third embodiments, the system bandwidth is generally frequency-divided for each group (a normal localized FDM (where bands are continuously occupied by individual groups) as opposed to distributed FDM). Such a technique as described above is advantageous when a relatively wide system band is provided, but not advantageous when a narrow system band is provided. In the fourth embodiment of the present invention, the system bandwidth is not divided in the frequency domain, but instead a time slot for a wideband group and a time slot for a narrowband group are provided separately, so that the user apparatuses of each group are time-division multiplexed. In this way, one of the left-hand side and the right-hand side in FIG. 5 (or FIG. 6) is implemented in one time slot, while the other is implemented within another time slot. According to the present embodiment, the present invention may be applied even when the system band is not sufficiently wide. When the system band becomes sufficiently wide, the present embodiment may be used, or the first and second and fourth embodiments may be combined.

Embodiment 5

Below a few ways of setting the group bandwidths are explained.

In an example shown in FIG. 9A, the number of users who belong to each group is measured for each cell, and the ratio of group bands is set for each group such that the ratio in group bandwidths equals the ratio in the numbers of users. In the illustrated example, the ratio in group bandwidths between the group band 1 and group band 2 in cell A is set as (10 users: 5 users)=(10 MHz: 5 MHz) (assuming the system bandwidth of 15 MHz). Similarly in cell B, the ratio in group bandwidths between the group band 1 and group band 2 is set as (8 users:7 users)=(8 MHz:7 MHz). In this way, the degree of congestion per unit band is maintained in a manner common to each group band and each cell, making it possible to achieve fairness among the users with respect to resource utilization.

In the illustrated examples, both cells A and B include 15 user apparatuses for brevity of explanation, but the number of user apparatuses may vary from one cell to another. For example, assuming that cell A includes 15 user apparatuses and cell B includes 21 user apparatuses, the number of users in cell B would be 14:7.

FIG. 9B shows an example of allocating group bandwidths common to each cell. In the illustrated example shown in FIG. 9A, the ratio of bandwidths is set for each cell, causing possible interference in cell A from a user apparatus in cell B that correspond to a portion denoted as "Z". As described above, this is because the narrowband user apparatus transmits a signal at relatively high power per unit band. In view of the above, in the example shown in FIG. 9B, the ratio in group bandwidths is maintained as common to each cell. In this example, the ratio in the numbers of users is not considered on an individual cell basis. Here, a ratio in group bandwidths that is common to the system overall (common to at least some of the cells) is provided, which is used as common to each cell. Arranging in this way makes it possible to directly prevent such portion as shown in "Z" of FIG. 9A from occurring.

FIG. 9C shows an example of allocating group bandwidths common to each cell. While the ratio in group bandwidths is set as common to each cell in the example shown in FIG. 9B, the degree of congestion per unit band differs from one cell to another and from one group band to another, which is not advantageous from a point of view of resource utilization efficiency. In the example shown in FIG. 9C, in addition to a ratio in the group bandwidths that is common to multiple cells being provided, classifying into groups is performed such that a ratio in the numbers of users is common from one cell to another. In other words, in the example shown in FIG. 9C, the classifying into groups is done such that the ratio in the numbers of users is 10:5=2:1 in each cell. In other words, in order for such classifying into groups to be implemented, such values as the path loss threshold, for example, are relatively adjusted. For example, assuming that cell A includes 15 user apparatuses and cell B includes 21 user apparatuses, the ratio in the numbers of users in the cell A becomes 10:5=2:1, and the number of users in the cell B becomes 14:7=2:1. As a result, in the example shown in FIG. 9C, in addition to being able to implement the ratio in group bandwidths that is common to each cell, and the ratio in the numbers of users that is common to each cell, the relationship of the ratio in the group bandwidths=the ratio in the numbers of users may also be achieved. From the viewpoints of preventing other-cell interference, which is of concern in FIG. 9A, and of alleviating unfairness among the users with respect to resource utilization, which is of concern in FIG. 9B, it is desirable to implement an allocation of bands as shown in FIG. 9C.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used. Breakdown of the embodiments are not essential to the present invention, so that two or more embodiments are used as needed. For convenience of explanation, while the apparatus according to the embodiments of the present invention is explained using functional block diagrams, such an apparatus as described above may be implemented in hardware, software, or their combination. The present invention is not limited to the above embodiments, so that variations, modifications, alternatives, and replacements are included without departing from the spirit of the present invention.

The present application claims priority based on Japanese Patent Application No. 2006-169451 filed on Jun. 19, 2006 with the Japanese Patent Office, the entire contents of which are hereby incorporated herein by reference.

The invention claimed is:

1. A base station in a mobile communications system which uses a single-carrier technique for uplink, comprising:
   a classifying unit which classifies, for each of multiple user apparatuses according to a path loss between the respective user apparatus and the base station, the multiple user apparatuses into two or more groups; and
   a scheduler which plans allocating of uplink resources to the multiple user apparatuses,
   wherein an uplink signal corresponding to each of the multiple user apparatuses includes
frequency components, the frequency components arranged uniformly,
   wherein, in each of group bands to which the corresponding user apparatus belongs, the frequency components of the uplink signal of the corresponding user apparatus are multiplexed using distributed frequency division multiplexing such that two types of pilot channels are made mutually orthogonal on a frequency axis,
   wherein the two types of pilot channels comprise a pilot channel for channel state measurement for measuring a channel state and a pilot channel for channel compensation for conducting channel compensation,
   wherein the scheduler plans the resource allocating such that the multiple user apparatuses belonging to different groups utilize different group bands or different time slots, and
   wherein the group bands are specified by dividing a system band into groups.

2. The base station as claimed in claim 1, wherein the scheduler plans the resource allocating such that the multiple user apparatuses belonging to the different groups utilize the different group bands.

3. The base station as claimed in claim 2, wherein a transmit bandwidth of a pilot channel for measuring a state of a channel transmitted from a user apparatus belonging to a group with a larger path loss equals an integer multiple of a transmit bandwidth of a pilot channel for channel compensation.

4. The base station as claimed in claim 2, wherein a transmit bandwidth of a pilot channel for measuring a state of a channel transmitted from a user apparatus belonging to a group with a larger path loss equals a transmit bandwidth of a pilot channel for channel compensation.

5. The base station as claimed in claim 2, wherein a group band with a larger path loss is set to each side of a group band with a smaller path loss.

6. The base station as claimed in claim 2, wherein a ratio of a bandwidth of a group band with a smaller path loss and a bandwidth of a group band with a larger path loss is determined according to a ratio in numbers of users belonging to each group.

7. The base station as claimed in claim 2, wherein a ratio of a bandwidth of a group band with a smaller path loss and a bandwidth of a group band with a larger path loss is common to multiple cells.

8. The base station as claimed in claim 2, wherein a ratio of a bandwidth of a group band with a smaller path loss and a bandwidth of a group band with a larger path loss, as well as a ratio in numbers of users belonging to each group is common to multiple cells.

9. A method used in a base station in a mobile communications system which uses a single-carrier technique for uplink, comprising:
    a classifying step by a classifying unit, of classifying, according to an uplink path loss for each of multiple user apparatuses, the multiple user apparatuses into two or more groups;
    a scheduling step by a scheduler, of planning allocating of uplink resources to the multiple user apparatuses,
    wherein an uplink signal corresponding to each of the multiple user apparatuses includes
frequency components, the frequency components arranged uniformly,
    wherein, in each of group bands to which the corresponding user apparatus belongs, the frequency components of the uplink signal of the corresponding user apparatus are multiplexed using distributed frequency division multiplexing such that two types of pilot channels are made mutually orthogonal on a frequency axis,
    wherein the two types of pilot channels comprise a pilot channel for channel state measurement for measuring a channel state and a pilot channel for channel compensation for conducting channel compensation,
    wherein the scheduling step plans the resource allocating such that the multiple user apparatuses belonging to different groups utilize different group bands or different time slots, and
    wherein the group bands are specified by dividing a system band into groups.

* * * * *